Figure 1:
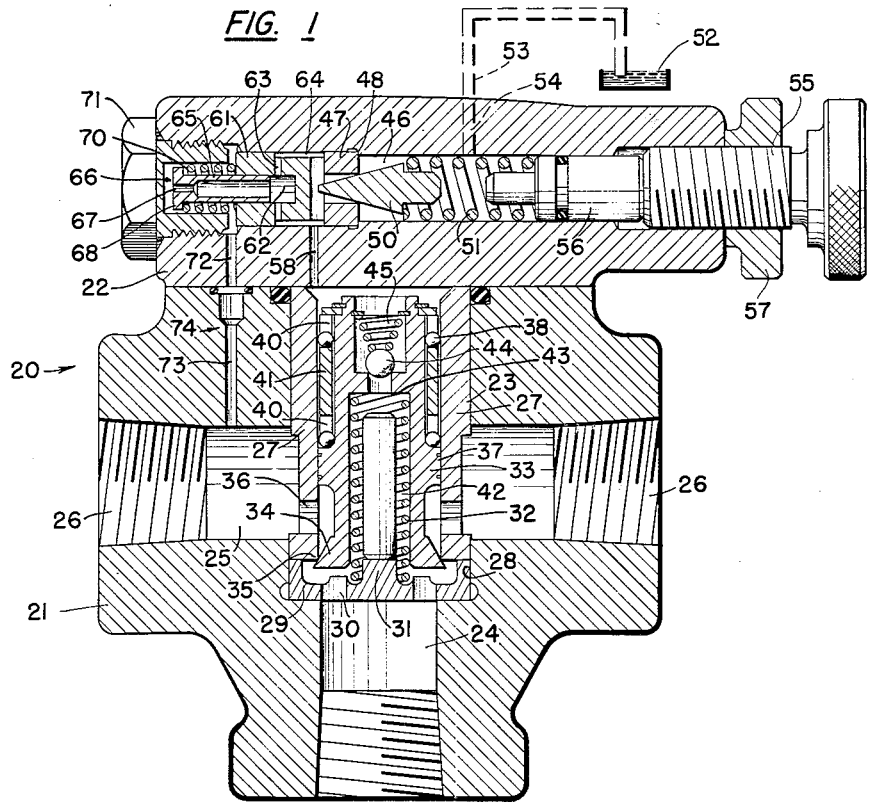

May 29, 1956

C. E. ADAMS ET AL 2,747,606

PRESSURE REDUCING VALVE

Filed Oct. 6, 1951

INVENTORS.
ELLIS H. BORN
CECIL E. ADAMS

BY Herschel C. Omohundro
Attorney

United States Patent Office 2,747,606
Patented May 29, 1956

2,747,606

PRESSURE REDUCING VALVE

Cecil E. Adams and Ellis H. Born, Columbus, Ohio, assignors to The Denison Engineering Company, Columbus, Ohio Application October 6, 1951, Serial No. 250,164

13 Claims. (Cl. 137—489.5)

This invention relates generally to the science of hydraulics and is more particularly directed to an improvement in apparatus used in hydraulic systems to control the flow of fluid under pressure.

An object of this invention is to provide a valve mechanism for use between two sections of a hydraulic system, the sections containing fluid at different pressures and the valve serving to control the communication between the sections so that the pressure in the section containing the lower pressure i. e. the secondary section will be maintained substantially uniform regardless of the changes in pressure in the other or primary section.

Another object of the invention is to provide a pressure reducing valve which will reduce the pressure of fluid flowing from the primary to the secondary section of a hydraulic system and maintain the reduced pressure in the secondary section with the least variation when the pressure changes in the main or primary section.

Another object of the invention is to provide a pressure reducing valve which permits the flow of fluid from the primary to the secondary section of a hydraulic system as long as the pressure in the latter section is below a predetermined value and then interrupt such communication when the predetermined pressure is reached, the valve parts being constructed and arranged that their response is almost instantaneous, the pressure in the secondary section thus being prevented from exceeding the predetermined value.

A further object of the invention is to provide a pressure reducing valve having a flow governing valve element which is normally biased toward a closed position but is responsive to fluid pressure from the primary section of a hydraulic system to open to permit fluid flow from the primary section to the secondary section, the valve element being responsive to the pressure in the secondary section to move toward a closed position when the desired pressure is reached in such section, the design of the valve being such that a quick closure will take place, this quick closing preventing or minimizing over run or the exceeding of the desired pressure in the secondary section.

A still further object of the invention is to provide a pressure reducing valve having a valve member which is normally closed by a spring but is opened, when fluid under pressure is initially supplied to the system, by applying such fluid under pressure to one end of the valve member to move it in opposition to the spring; a relief valve is provided so that when the pressure in the system reaches a predetermined value the pressure of fluid being applied to the valve member to move it against the spring, will be stabilized; then as the pressure in the system continues to increase, the fluid pressure at the opposite end of the valve plus the force of the spring will move the valve to a closed position thus preventing the pressure in the secondary section of the system from continuing to increase even though the pressure in the primary section does increase.

It is also an object to provide a pressure reducing valve of the type mentioned in the preceding paragraph with a flow restricting means to limit the flow of fluid to the valve member to move it in opposition to the spring, this flow restricting means serving to prevent excessive flow of fluid under pressure to exhaust when the relief valve opens to stabilize the fluid pressure applied to the end of the valve member to move it open.

Another object of the invention is the use of a novel method of suspending or supporting the valve member of the reducing valve so that it will not stick or bind but may move quickly and easily whenever the pressure differential at the ends of the valve member is reversed.

An object of the invention also is to provide a pressure reducing valve having a body with primary and secondary pressure sections and a flow governing element for controlling communication between such sections, the body having a control pressure section to which a portion of the flow governing element is exposed, an opposite portion of the element being exposed to the secondary pressure section, the body being provided with a restricted passage establishing continuous communication between the primary pressure section and the control pressure section and a relief valve controlled passage connecting the control pressure section with exhaust, the relief valve in the last-mentioned passage serving to maintain a substantially uniform predetermined pressure in the control pressure section so that when the pressure in the secondary pressure section starts to exceed that in the control pressure section the flow governing element will be urged to a closed position to interrupt communication between the primary and secondary pressure sections; when the pressure in the secondary pressure section decreases, the force of the fluid in the control pressure section will again move the flow controlling element to an open position to reestablish communication between the primary and secondary pressure sections.

Further objects and advantages of the present invention will be apparent from the following description, reference being had to the accompanying drawings wherein a preferred form of embodiment of the invention is clearly shown.

Figure 2:
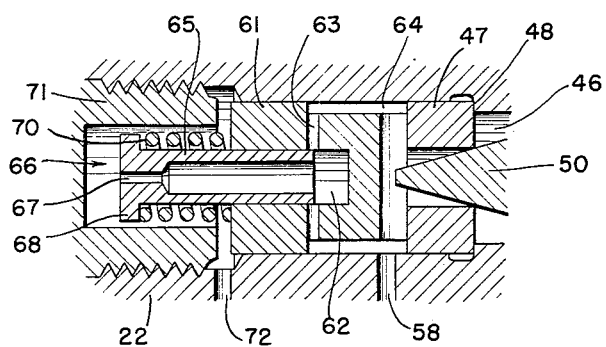

In the drawings:

Fig. 1 is a vertical longitudinal sectional view taken through a valve formed in accordance with the invention and Fig. 2 is a fragmentary sectional view on an enlarged scale of a portion of the valve shown in Fig. 1 the plane of this view being the same as the plane of the section shown in Fig. 1.

Referring more particularly to the drawing the numeral 20 designates the valve in its entirety. This valve includes a body 21 which may be cast or otherwise formed from suitable metal and a cap section 22 formed in a similar manner. The body 21 is provided with a central opening 23 which enters the body from the upper end and terminates in a reduced extension 24 at its lower portion. The body is also provided with a horizontally extending passage 25 which in the present embodiment of the invention extends completely through the body. This passage is threaded at both ends as at 26 as is also the lower end of the extension 24, the threaded portions permitting the body to be connected in a hydraulic system. The opening 23 receives a liner 27 which is located in the body by an annular shoulder 28 formed by the reduction in the diameter of the opening 23. Between the liner 27 and the shoulder 28 there is disposed a spring abutment washer 29, this washer having openings 30 for the passage of fluid therethrough and a central projection 31 for locating the lower end of a coil spring 32. This coil spring is employed to normally urge a piston valve 33 in an upward direction to cause the engagement of a tapered head 34 thereon with a seat 35 formed by the lower inner edge of the liner 27.

In registration with the passage 25 the liner is formed with openings 36 so that fluid introduced into the passage 26 will have access to the interior of the liner. The openings 36 are arranged above the seat 35 and fluid entering the liner through the openings will be confined in the space around the piston valve while the head 34 is in engagement with the seat 35. The piston valve 33 has a piston section 37 which is slidable in the liner 27. A relative close fit between the piston and the liner will permit the piston to move but under normal conditions is so close that fluid flow between these elements will be merely enough to keep the elements lubricated. The piston section is maintained in concentric relationship with the liner by providing the piston valve with a suspension type mounting similar to that disclosed in the co-pending application of C. E. Adams, Serial No. 245,239, filed September 5, 1951. This mounting includes a plurality of sets of ball bearings 38 which are disposed between a reduced portion of the piston valve and the inner surface of the liner 27. The ball elements 38 are disposed in slots 40 formed in a sleeve-like retainer 41, this member being positioned between the inner wall of the liner 27 and the reduced extension of the piston valve. As previously mentioned the piston valve is to be maintained in a concentric relationship with the liner, therefore, the dimensions of the balls 38 must be accurately maintained; in certain instances a preloading effect may be secured, if desired. Under normal conditions the ball elements 38 are disposed at the lower ends of the slots 40 as viewed in Fig. 1, when the head 34 of the piston valve is engaged with the seat; this arrangement permits the valve to move away from the seat with a minimum amount of friction. In the normal operation of the valve the distance moved will be relatively small. The slots, however, are made long enough to permit an excessive amount of movement.

The piston valve is provided with a central socket 42 to receive the spring 32, the upper end of this member being engaged with an annular shoulder 43 provided by a transversely extending wall. This wall is formed with an opening at its central portion and a ball element 44 normally engages the upper edge of the central opening where it is resiliently retaned by a conical spring 45. This ball 44 provides a check valve which will permit fluid to flow in an upward direction through the central opening but will prevent reverse fluid flow.

The cap section 22 constitutes a control section and includes a horizontal bore 46 into which a seat insert 47 is pressed, this insert being located by a shoulder 48. The insert is engaged by a cone-shaped valve 50, the latter being disposed at the outer side of the seat 47 and being yieldably held in engagement with the seat by a coil spring 51. The bore 46 communicates with the reservoir 52 of the hydraulic system through a conduit 53 which is connected with an exhaust port 54 formed in the cap section 22. The force of the spring 51 is varied through the manipulation of an adjusting screw 55 which is threaded into the cap section 22 to effect longitudinal movement of a spring abutment member 56. The positions of adjustment of the screw 55 and abutment member are maintained by a locknut 57. The bore 46 also communicates with the upper end of the opening 23 through a passage 58 formed in the cap section 22. The passage 58 is located ahead of the valve seat insert 47 so that communication between the upper end of the opening 23, which constitutes a control pressure section, and exhaust will be governed by the valve 50. The control pressure section is also formed by a guide member 61 which is pressed into the bore 46 after the valve seat insert 48 is disposed therein. The guide section 61 has a central longitudinal opening 62 and transverse openings 63 the latter establishing communication between the central opening 62 and an annular recess 64 formed in the guide section. The opening 62 slidably receives a small spool element 65 which constitutes the regulating element of a flow control valve generally designated by a numeral 66.

The spool 65 has a central passage with an orifice 67 formed therein, this orifice serving to provide a pressure differential upon fluid flow through the valve spool. The spool has a shoulder 68 at one end which is engaged by a coil spring 70, the other end of this spring engaging the guide 61. Normally the spool is held spaced from the transverse ports 63 so that fluid may flow through the spool and the ports 63 to the control pressure section of the valve. When the higher pressure of the pressure differential increases substantially, however, the spool will be moved in opposition to the spring 70, until the end portion of the spool restricts fluid flow through the ports 63. In this manner the flow of fluid to the control section of the valve will be limited. The end of the bore 46 is closed by a plug member 71, this plug and the guide 61 being spaced substantially to provide a chamber which is connected by a passage 72 with a drilled hole 73 formed in the body 21. This drilled hole connects with the passage 25 extending through the body, the drilled holes, passages, and orifice 73, 72, 67, 62, 63, 64 and 58 all combining to form a restricted passage, generally indicated by the numeral 74, which connects the passage 25 with the control pressure section formed by the portion of the opening 23 at the upper end of the piston valve 33. This passage 74 provides for the continuous but restricted flow of fluid from the passage 25 to the control pressure zone at the upper end of the piston valve.

When the reducing valve is connected in a hydraulic system, the passage 25 communicates directly with the high pressure section of the system, that is, the section directly connected with a source of fluid under pressure. When the operation of the system is initiated fluid will flow into the passage 25, through the ports 36 to the space around the piston valve between the head 34 and the piston section 37. Since the head and the piston section provide oppositely facing areas of equal dimensions the force of this fluid under pressure will be balanced and the valve will tend to remain closed by the force of the spring 32. Some of this fluid, however, will flow through the passage 74 to the upper end of the opening 23. The force of this fluid will be applied to the upper end of the piston valve and since the lower end of the member is exposed to the pressure in the passage 24, which at this time will be lower than the pressure in the passage 25, the piston valve will be moved to an open position permitting fluid to flow from the passage 25 directly to the passage 24. As the pressure in the system increases its force will be applied to the end of the cone shaped valve 50 and will tend to move this valve away from the seat 47. When sufficient pressure has been generated this valve 50 will move away from the seat 47 and connect the control pressure zone with the outlet 54. Fluid flowing through the passage 74 will then be permitted to flow to exhaust and the pressure in the control pressure zone of the piston valve will be maintained at the value determined by the setting of the spring 51. This pressure is applied to the end of the piston valve exposed to the control pressure zone.

Before valve 50 starts to open, there will be a pressure drop across the valve seat 35 depending upon the force of the spring 32 and other resistance offered by the valve and seat. When the valve 50 opens, and the pressure in the control pressure zone ceases to increase, the force tending to close the valve 33 provided by the fluid pressure in passage 24 and the spring 32 will increase and soon exceed the force tending to hold the valve 33 open exerted by the fluid pressure in the control pressure zone. The valve 33 will then close and prevent further increase in pressure in the passage 24 which constitutes the secondary pressure section of the valve. It will be understood that the increase in pressure in zone 24 which is necessary to effect the closing of the valve 32 is slight and the valve, therefore, will rapidly close when the relief valve 50 is opened to the proper extent.

The flow control valve 66 is also effective upon the opening of the valve 50 to further restrict the flow of fluid under pressure through the passage 74. It will be understood that by the provision of the flow control valve the quantity of fluid permitted to flow through the passage 74 will be maintained at the minimum necessary to hold the pressure in the control pressure zone at the value determined by the setting of the relief valve spring. When fluid flow through passage 74 tends to increase due to the opening of the valve 50 the pressure differential created by fluid flow through the orifice 67 will cause the flow control valve to reduce fluid flow through the passage 74 and in this manner prevent loss of fluid pressure. Also due to the limiting of fluid flow through the passage 74 the volume of fluid which will have to be displaced by the valve 33 as it moves to a closed position will be maintained at a minimum. This feature contributes materially to the efficiency of the valve inasmuch as it permits the valve to close quickly, therefore, preventing the excessive flow of fluid from the high pressure section of the hydraulic system to the low pressure or secondary section thereof. This rapid operation has another advantage in that it narrows the range of pressure increase or over run due to an excessive flow of fluid from the primary pressure section of the system to the secondary section thereof. In the event the pressure in the secondary section of the hydraulic system should tend to increase excessively fluid may flow past the check valve 44 to the upper end of the opening 23 and be exhausted through the relief valve 50, the valve 44 closing as soon as the excessive pressure is relieved.

It is important to note that the valve 33 is normally urged toward a closed position and is opened by a pressure differential existing at opposite ends thereof. The higher pressure of this pressure differential is applied to the upper end of the piston valve as long as the pressure for which the relief valve 50 is set is not exceeded. When this pressure is exceeded, however, and relief valve 50 opens, the force of the fluid pressure at the lower end of the valve will increase until it is sufficient to cause the valve to close rapidly. The check valve 44 constitutes a safety measure and is provided to allow any excess pressure in the secondary section of the system to be directed to exhaust.

While the form of embodiment of the present invention as herein disclosed constitutes a preferred form, it is to be understood that other forms might be adopted, all coming within the scope of the claims which follow:

We claim:

1. A pressure reducing valve comprising a body having a chamber and main and secondary pressure ports connected therewith; a valve element disposed for movement in said chamber to control communication between said main and secondary pressure ports; yieldable means urging said valve element toward a position to prevent such communication; passage means connecting said main pressure port and said chamber to apply fluid under pressure to said valve element to move the same in opposition to said yieldable means; an exhaust passage communicating with said first-mentioned passage means; a resiliently closed valve for controlling fluid flow through said exhaust passage; and a constant volume flow control valve including a movable element in said first-mentioned passage between the point of communication of said exhaust passage therewith and the connection with said main pressure port, said flow control valve being normally open and responsive to a fluid pressure differential to move toward a closed position.

2. A pressure reducing valve comprising a casing having an internal bore and inlet and outlet ports communicating therewith; a piston valve disposed for movement in said bore to control communication between said ports; resilient means tending to move said valve toward closed position; passage means connecting said inlet port and one end of said bore to apply fluid under pressure to said piston valve to tend to move the same toward open position in opposition to said resilient means, the opposite end of said piston valve being exposed to outlet port pressure; a normally open constant volume flow controlling valve including a movable element responsive to fluid pressure to move toward a closed position in said passage means; a tank passage connected with said first-mentioned passage means; and a resiliently closed valve in said tank passage for controlling fluid flow therethrough.

3. A pressure reducing valve comprising a body having an internal chamber and spaced inlet and outlet ports communicating therewith; a valve seat in said body between said inlet and outlet ports; a piston valve disposed for sliding movement in said chamber toward and away from said seat; spring means tending to urge said valve toward said seat; a passageway leading from said inlet port to one end of said chamber to apply pressure to said valve to move the same away from the seat in opposition to said spring; an exhaust line communicating with said one end of said chamber; a resiliently closed relief valve in said exhaust line to control the pressure in said one end of said chamber; and a constant volume flow control valve in said passageway responsive to the rate of fluid flow therethrough to control fluid flow through said passageway.

4. A pressure reducing valve comprising a body with a piston chamber and inlet and outlet ports communicating therewith; a piston valve disposed in said chamber for movement to control communication between said inlet and outlet ports, said piston valve having a first end exposed to inlet port pressure and a second end exposed to outlet port pressure, the inlet pressure tending to move said valve toward open position; spring means engaging said valve and urging the same toward a closed position in opposition to said inlet port pressure; a relief valve responsive to the pressure applied to the first end of said valve to expose such end of the valve to a reduced pressure; and a constant volume flow control valve in said passageway, said flow control having an orifice and a movable element responsive to a pressure differential caused by fluid flowing through said orifice to limit the volume of fluid flowing from the inlet port to the first end of said valve.

5. A pressure reducing valve comprising a body having a piston chamber and inlet and outlet ports communicating therewith; a piston valve disposed in said chamber for movement to control communication between said ports; spring means urging said piston valve toward a communication interrupting position; a passage extending from said inlet port to said piston chamber to apply fluid pressure to one end of said piston valve to move the same in opposition to said spring means; a spool element disposed for movement in said passage to govern fluid flow therethrough; an orifice in said passage for creating a pressure differential in response to fluid flow through said passage, the higher pressure of said differential being applied to one end of said spool to move the same toward passage obstructing position; a spring engaging said spool and tending to oppose movement thereof by such pressure; and a relief valve for venting the pressure in said passage between said spool and said piston chamber.

6. A pressure reducing valve comprising a body having a chamber and main and secondary pressure ports communicating therewith; a valve element disposed in said chamber to control communication between said port, said valve dividing said chamber to provide a control pressure section to which a portion of the valve is exposed, an opposite portion of said valve being exposed to the pressure in said secondary pressure port which pressure tends to move said valve toward a closed position; a passageway between said main pressure port and said control pressure section; flow control means in said passageway, said flow control means having a valve element resiliently urged toward an open position; means in said passage to cause a pressure differential upon fluid flow through said passage, said valve element being responsive to a differential in pressures between the inlet and outlet sides of said pressure differential causing means to move toward a closed position; a second passageway between said control pressure section and exhaust; and a relief valve in said second passageway to limit the pressure in said control pressure section.

7. A pressure reducing valve comprising a body with an internal chamber and inlet and outlet ports communicating therewith; a piston valve disposed for movement in said chamber to control communication between said ports, said piston valve forming a control pressure zone at one end of said internal chamber and having substantially equal end areas exposed to the pressures in said control pressure zone and said outlet ports; means forming passage sections connecting said control pressure zone with said inlet port and exhaust; a constant volume flow control mechanism in the passage section between said control zone and said inlet port; and a relief valve between said control zone and exhaust.

8. A pressure reducing valve comprising a body with an internal chamber and inlet and outlet ports communicating therewith; a piston valve disposed for movement in said chamber to control communication between said ports, said piston valve forming a control pressure zone at one end of said internal chamber and having substantially balanced pressure engaged end areas; means forming passage sections connecting said control pressure zone with said inlet port and exhaust; a constant volume flow control mechanism in the passage section between said control zone and said inlet port, said flow control mechanism having a valve responsive to a predetermined pressure differential at opposite sides thereof to provide a constant volumetric flow through said passage section; and a relief valve between said control zone and exhaust.

9. A pressure reducing valve comprising a body with an internal chamber and inlet and outlet ports communicating therewith; a piston valve disposed for movement in said chamber to control communication between said ports, said piston valve forming a control pressure zone at one end of said chamber and having balanced pressure engaged end areas; means forming passage sections connecting said control pressure zone with said inlet port and exhaust; a relief valve in the passage section between said control pressure zone and exhaust; a constant volume flow control in the passage section connecting said control pressure zone and said inlet port; and a check valve controlled passage between said outlet port and said control pressure zone.

10. A pressure reducing valve comprising a body with an internal chamber and inlet and outlet ports communicating therewith; a piston valve disposed for movement in said chamber to control communication between said ports, said piston valve forming a control pressure zone at one end of said chamber and having balanced pressure engaged end areas; a check valve controlled passage extending between opposite ends of said piston valve; means forming passage sections connecting said control pressure zone with said inlet port and exhaust; a constant volume flow control mechanism in the passage section between said control zone and said inlet port; and a relief valve between said control zone and exhaust.

11. A pressure reducing valve comprising a body with an internal chamber and inlet and outlet ports communicating therewith; a piston valve disposed for movement in said chamber to control communication between said ports, said piston valve forming a control pressure zone at one end of said chamber and having balanced pressure engaged end areas; spring means tending to urge said piston valve toward closed position; means forming passage sections connecting said control pressure zone with said inlet port and exhaust; a constant volume flow control mechanism in the passage section between said control zone and said inlet port; and a relief valve between said control zone and exhaust.

12. A pressure reducing valve comprising a body with an internal chamber and inlet and outlet ports communicating therewith; a piston valve disposed for movement in said chamber to control communication between said ports, said piston valve forming a control pressure zone at one end of said chamber and having balanced pressure engaged end areas; means forming passage sections connecting said control pressure zone with said inlet port and exhaust; a constant volume flow control in the passage section between said control pressure zone and said inlet port; and an adjustable relief valve in the passage section between said control pressure zone and exhaust.

13. A pressure reducing valve comprising a body with an internal chamber and inlet and outlet ports communicating therewith; a piston valve disposed for movement in said chamber to control communication between said ports, said piston valve forming a control pressure zone at one end of said chamber and having balanced pressure engaged end areas; means forming passage sections connecting said control pressure zone with said inlet port and exhaust; flow control means in the passage section connecting said control pressure zone and said inlet port, said flow control means having a port forming a part of said passage section; a spool member disposed for movement to vary the size of such port; spring means tending to urge said spool member in a direction to increase the size of such port; means forming an orifice in said passage section, fluid flow through said passage section creating a pressure differential at opposite sides of said orifice, the higher pressure of the differential being applied to said spool to move the same against said spring means and the lower pressure being applied to the opposite end of said spool; and a relief valve in the passage section between said control pressure zone and exhaust.

References Cited in the file of this patent

UNITED STATES PATENTS

| Number | Name | Date |
|---|---|---|
| 648,591 | Metzer | May 1, 1900 |
| 740,495 | Waring | Oct. 6, 1903 |
| 1,098,616 | Creveling | June 2, 1914 |
| 2,047,101 | Grove | July 7, 1936 |
| 2,171,613 | Vance | Sept. 5, 1939 |
| 2,580,128 | Renick | Dec. 25, 1951 |

FOREIGN PATENTS

| Number | Country | Date |
|---|---|---|
| 77,027 | Germany | Sept. 5, 1894 |
| 403,787 | Great Britain | Jan. 4, 1934 |